Figure 1:
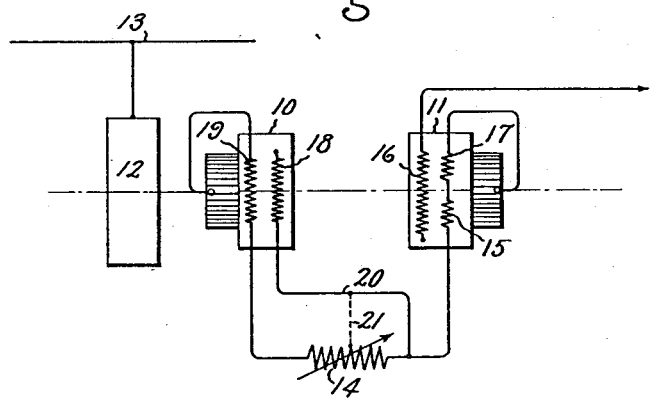

June 3, 1930.    W. SEIZ    1,761,753
EXCITER AND EXCITING SYSTEM FOR DYNAMO ELECTRIC MACHINES
Filed Jan. 29, 1929    2 Sheets-Sheet 1

Inventor:
Walter Seiz,
by Charles E. Mullen
His Attorney.

June 3, 1930.  W. SEIZ  1,761,753
EXCITER AND EXCITING SYSTEM FOR DYNAMO ELECTRIC MACHINES
Filed Jan. 29, 1929   2 Sheets-Sheet 2

Inventor:
Walter Seiz,
by Charles E. Tullar
His Attorney.

Patented June 3, 1930

1,761,753

UNITED STATES PATENT OFFICE

WALTER SEIZ, OF BADEN, SWITZERLAND, ASSIGNOR TO GENERAL ELECTRIC COMPANY, A CORPORATION OF NEW YORK

EXCITER AND EXCITING SYSTEM FOR DYNAMO-ELECTRIC MACHINES

Application filed January 29, 1929, Serial No. 335,841, and in Germany January 30, 1928.

My invention relates to alternating current commutating machines, more particularly to series connected commutator machines having exciting windings including a separately excited winding in which the combination is arranged to supply current to a variable impedance winding. The magnitude of the current supplied to the latter winding is made approximately proportional to the current of the separately excited winding and approximately independent of the changes in the impedance of the supplied winding.

The invention is particularly useful in the problem of the excitation of polyphase commutator machines which are used to regulate the speed or the reactive current of an induction machine and its purpose is to provide means whereby one may control the excitation of the commutator regulating machine by means of the control of only a small kva instead of the comparatively large kva of excitation necessary for the regulating machine.

In particular cases it is desirable to supply a single- or multi-phase circuit of variable impedance, such for example as the exciting windings of variable frequency alternating current dynamo-electric machines, with a given current which is approximately proportional to another current.

One method of accomplishing this result has been to supply the variable impedance with a current generated by a dynamo-electric machine having two or more exciting windings. One of the exciting windings is separately excited while the other exciting winding is connected in series with the armature of the dynamo-electric machine, and is excited with a current which is proportional to the armature voltage. By arranging the exciting windings so that the flux due to the separately excited winding opposes the flux due to the other exciting winding, the resultant flux of the two windings can be controlled by varying the current in the separately excited winding. However, in order to insure stable conditions of the current supplied to the variable impedance, which is due to the resultant flux, the flux produced by the exciting windings must be large as compared to the resultant flux. Such a machine has the disadvantage that it must be extraordinarily large as compared with a machine having exciting windings, the fluxes of which do not oppose each other. Furthermore, the exciting current of the two opposed windings required to produce a resultant flux is large as compared to the exciting windings required to produce a corresponding flux in the latter machine. My invention in one of its aspects contemplates the provision of means for supplying current to a variable impedance winding and means for controlling the magnitude of the current by manipulating only a small portion of the exciting current instead of the comparatively large exciting current as was necessary with the apparatus referred to above.

In carrying my invention into effect in one form thereof I provide two alternating-current commutator machines arranged to supply a circuit of variable impedance with a current which is proportional to the primary exciting current of one of the machines. The armature circuits of both commutator machines are connected in circuit with the variable impedance, and one of the commutator machines is excited by a current proportional to its armature voltage and the primary exciting current while one of the exciting windings of the other commutator machine is connected to the variable impedance, and its other winding is excited by a current proportional to its armature voltage.

Figure 2:
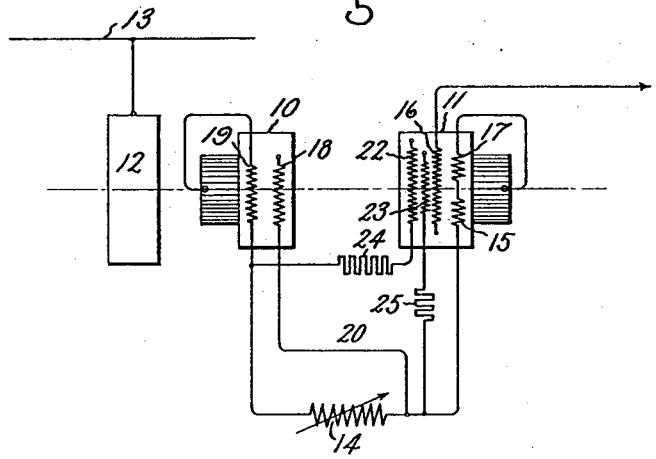
Figure 3:
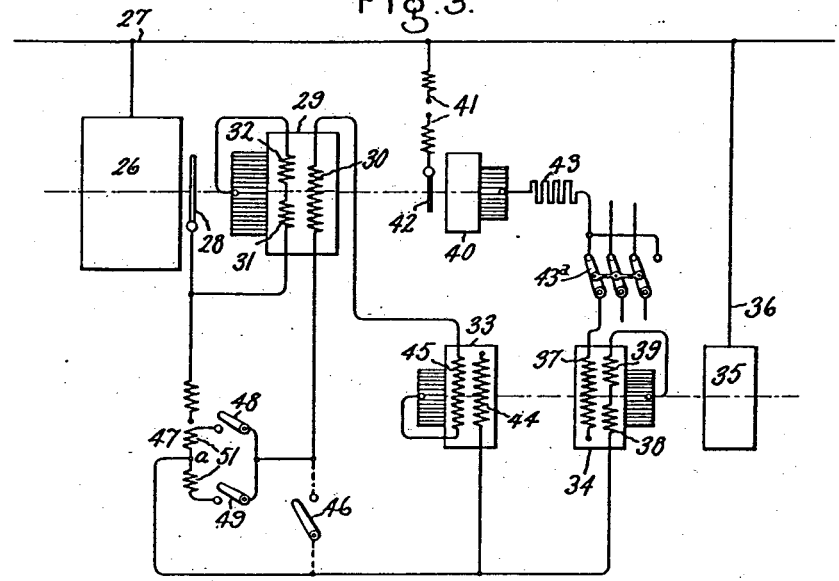
Figure 4:
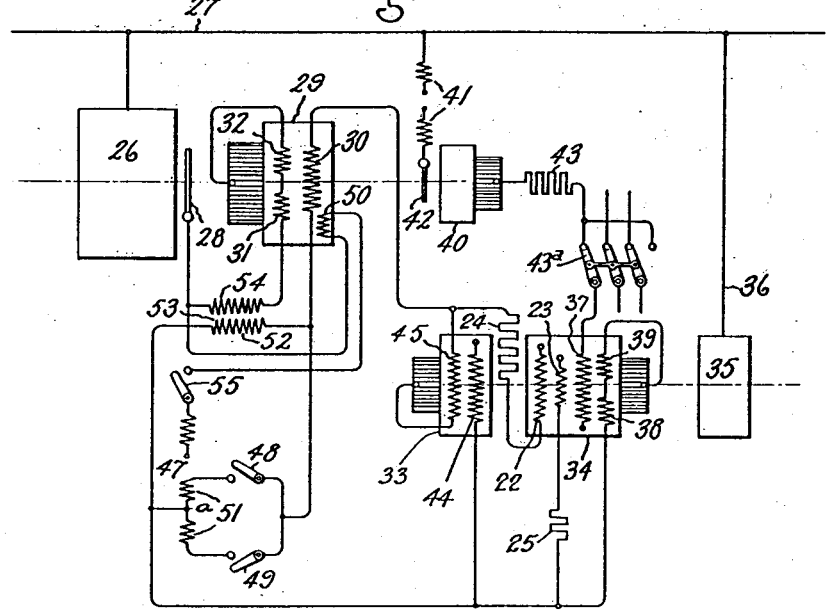

The features of my invention which are believed to be novel and patentable will be pointed out in the claims appended hereto. For a better understanding of my invention reference should be had to the accompanying drawing, in which Fig. 1 shows two alternating-current commutator machines arranged according to my invention to supply current to a variable impedance; Fig. 2 shows the two commutator machines of Fig. 1 together with additional features to obtain certain refinements in operation; Fig. 3 represents the apparatus shown in Fig. 1 and arranged in accordance with my invention for supplying an exciting winding of a commutator regulating machine connected in cascade with an induction machine; and Fig. 4 represents a similar arrangement of the apparatus comprising my invention, with additional means for exciting the commutating pole field windings of the commutator machine which is connected in cascade with the main induction machine.

My invention is intended to apply to a polyphase alternating current system, but for the purpose of clearness in all the figures the connections are indicated for one phase only.

Referring to Fig. 1, I have shown two commutator machines 10 and 11 having their rotors mounted upon a common shaft and mechanically connected to an asynchronous motor 12 which is electrically connected to an alternating current supply system 13. The commutator machines have field and armature windings and a variable impedance 14 is connected in circuit with the armature or rotor windings. As will subsequently be explained, the impedance 14 may be a field winding of a third machine energized under such conditions that its effective resistance varies. In order to supply the variable impedance 14 with a current which is proportional to the current of an external supply source, I provide the commutator machine 11 with two opposed exciting windings 15 and 16. One of these, that is the exciting winding 15, is connected in series with the armature winding, together with a compensating winding 17, while the exciting winding 16 is separately excited by current supplied from an external source. In order to ensure stable conditions the exciting winding 15 is designed so that its flux is always a multiple of the resultant flux of the two opposed exciting windings. The machine 10 is arranged so that its armature voltage is approximately equal to the voltage drop of the impedance 14. The machine 11 serves to supply current to the exciting winding 18 of the commutator machine 10. Thus as shown, the winding 18 is connected directly across the armature circuit of the commutator machine 11. To prevent self-excitation of machine 10 the winding 18 is preferably arranged to induce in the armature a voltage which is out of phase with the armature current. The compensating winding 19 of machine 10 is connected in series with its rotor winding.

According to this arrangement two influences tend to disturb the desired proportionality between the exciting current of winding 16 and the current through the variable impedance 14. As will be understood, the current of impedance 14 differs from that of winding 15 by the current of the exciter winding 18 and the flux of winding 15 differs from that of winding 16 by the resultant flux of the machine 11.

In order to practically eliminate these disturbances I provide the machine 11 with additional exciting windings. Thus, referring to Fig. 2, it will be observed that I have provided the machine 11 with two additional exciting windings 22 and 23. The winding 22 is supplied with current through resistance 24 from the armature circuit of the commutator machine 10, while winding 23 is supplied with current through resistance 25 from the armature circuit of machine 11. Otherwise, the arrangement of Fig. 2 is essentially the same as that shown in Fig. 1 and I have represented like parts by like reference characters. It will be understood that the current which is supplied to winding 22 is proportional to the armature voltage of machine 10 and this voltage is proportional to the current of exciting winding 18 as long as it works below the saturation limit. The desired proportionality between the voltage and current supplied to winding 22 may be obtained by the interposition of a suitable resistance 24.

In Figs. 1 and 2 the flux of the separately excited windings 16 is equal in each case. The flux of winding 22 is proportional to the armature voltage of machine 10. Thus the current of winding 15 of Fig. 2 differs from the current of this winding in Fig. 1 by an amount proportional to the current in winding 22 which is proportional to the armature voltage of machine 10 and this quantity I cause to be equal to the current of winding 18 by suitably proportioning the winding 22. One of the disturbances produced by the resultant flux of machine 11 according to the arrangement shown in Fig. 1 can be avoided if necessary by the use of an additional exciting winding 23 which is connected across the armature circuit of machine 11 and which is supplied with a current proportional to its armature voltage. By inserting a resistance 25 and suitably dimensioning the winding 23 its flux may be made equal to the resultant flux of the machine 11. This applies so long as machine 11 operates at constant speed below the saturation. If the flux of winding 23 is equal to the resultant flux of machine 11, then the geometrical sum of the fluxes of windings 15, 22 and 16, is equal to zero, and the disturbing influence in the resultant flux of the machine is eliminated. The current generated by machine 11 will be proportional to the flux of the exciting winding 23, the flux of which is made equal to the resultant flux of the machine 11. This result cannot be obtained absolutely, but the disturbing influences can be eliminated as near as will be desirable in practical application. In the connection of Fig. 1 the armature voltage of machine 10 approximately equals the voltage drop in impedance 14. It may be desirable in particular cases to more evenly divide the load between the commutator machines 10 and 11. This may be accomplished by connecting the exciting winding 18 to any intermediate point on the variable inductive or ohmic resistance 14, such for example as indicated by the dotted line 21, shown in Fig. 1.

In Fig. 3 I have shown the commutator machines referred to and explained in connection with Figs. 1 and 2, arranged to supply exciting current to a commutator regulating machine which is connected in cascade with an induction motor. The induction motor 26 has primary and secondary windings. The primary winding is connected to an alternating-current supply system 27 and the secondary winding is located on the rotor and connected to the slip rings 28, only one of which is shown. I have shown the commutator regulating machine 29 as having its rotor mounted on the same shaft as the rotor of the main induction motor and connected in circuit with the rotor winding of the induction motor 26. The commutator regulator machine 29 has two exciting windings 30 and 31 and a compensating winding 32. I have shown two alternating-current commutator machines 33 and 34 having their rotors mounted on the same shaft and mechanically connected to an asynchronous motor 35 which is electrically connected to the alternating-current supply system 27. In order to supply the exciting winding 30 of the regulating machine 29 with an exciting current the magnitude of which is proportional to the slip frequency of the induction machine and to the current in a separately excited winding of the commutator machine 34, I connect the exciting winding 30 in circuit with the rotor windings of the commutator machines and also associate it with the rotor winding of the induction motor when it is operating at speeds other than synchronous speed. The compensating winding 32 and the exciting winding 31 are connected in series with their armature circuit. In particular cases it may not be desirable to use the exciting winding 31. This will depend to a great extent upon individual load conditions. The commutator machine 34 has two opposed exciting windings 37 and 38 and a compensating winding 39. The compensating winding 39 and exciting winding 38 are connected in series with the rotor armature of machine 34. In order to supply the separately exciting winding 37 with an exciting current I provide a frequency changing exciter 40 mounted on the same shaft as the main induction motor 26 and supply it with exciting current from the alternating current supply system 27 through any suitable adjustable potential transformer 41 and the slip rings 42 only one of which is shown. The exciting winding 37 is connected through a resistance 43 and a suitable reversing switch represented at 43$^a$ to the commutator of the frequency changing exciter 40.

The commutator machine 33 has an exciting winding 44 and a compensating winding 45. As will be noted from the figure the compensating winding 45 of machine 33 is connected to the main exciting winding 30 of machine 29. A switch 46 is placed in circuit with the exciting winding 30. As will be noted from the figure, by closing switch 46 the exciting winding 30 will be connected in series with the rotor windings of machines 33 and 34. Thus, it will be seen with the arrangement as illustrated in Fig. 3 and described above, when the switch 46 is closed a complete series circuit is made through the armature windings of machines 33 and 34 and the exciting winding 30. It will be understood that with an arrangement of this kind an exciting current for winding 30 may be supplied by the machines 33 and 34 the magnitude of which is independent of the slip frequency and also the speed of the main induction machine 26. It is well known to those familiar with the art that the voltage required for speed regulation of induction motors at speeds considerably remote from synchronism is more than required to regulate the speed when the motor is operating at or near synchronism. In order to assist the commutator machines 33 and 34 in supplying the exciting current that is necessary to produce the voltage which is required to regulate the speed of the induction motor over its entire speed range I have arranged by means of a transformer 47 to supply the exciting winding 30 with an additional exciting current from the slip rings of the main induction machine at speeds other than synchronous speed. The primary winding of transformer 47 is connected across the slip rings of the main induction machine and the secondary of the transformer is connected through switches 48 or 49 to the exciting winding 30 of machine 29. When the induction motor 26 is operating at synchronous speed there will be no exciting current supplied by its secondary to the exciting winding 30 of the regulating machine 29, but the voltage required for speed control through synchronism is comparatively small and the exciting current for the regulating machine 29 will be supplied by the commutator machines 33 and 34. If it is desirable to disconnect the transformer from the supply circuit of the exciting winding 30 at synchronism it is but necessary to close switch 46 and open switches 48 and 49. By arranging the transformer 47 so at a given slip, for example 5/6 of the maximum slip of the induction motor 26 it will supply all the exciting current necessary for winding 30 at this particular speed, the commutator machines 33 and 34 can be made considerably smaller than if they were required to supply all the exciting current to winding 30 while operating the induction motor over its entire speed range.

As is well known to those familiar with the art, the frequency of the voltage supplied by the secondary of the induction motor 26 to the exciting winding 30 is equal to the slip frequency of the induction motor and the frequency of the voltage supplied to the primary exciting winding 37 of the commutator regulating machine 34 by the frequency changing exciter 40 is equal to the slip frequency of the induction motor 26 since the frequency changing exciter is rotated at the same speed as the induction motor and excited from the same supply system. As the speed of the induction motor is regulated from below synchronism to above synchronism the direction of the voltage induced in its secondary and also the direction of the voltage supplied by the frequency changing exciter will be reversed but since the voltage impressed on the slip rings of the main induction motor must be in the same direction when the machine is operating above synchronism as when operating below, the primary or secondary of the transformer 47 must be reversed, also the circuit connections for the exciting winding 37 must be reversed when the induction motor passes through synchronism. The reversal of the circuit connections of the exciting winding 37 may be effected by placing a phase reversing switch 43ᵃ in its circuit which may be operated either manually or in any other well known manner, or any other well known means for preventing the reversal of the direction of the voltage may be used. In order to reverse the connections of transformer 47 I have designed the secondary of the transformer for double the required voltage and use one half of it at a time. The circuit of exciting winding 30 and the armature windings of machines 33 and 34 are connected to the secondary of the transformer 47 at the intermediate joint $a$ and through one or the other of the switches 48 and 49. It is well known, with connections as illustrated when the switch 48 is opened and switch 49 is closed the direction of the voltage supplied to the exciting winding 30 will be in a given direction, but by opening the switch 49 and closing the switch 48 the direction of the voltage will be reversed. Switch 46 is closed only when operating through synchronism. Thus it will be seen that when the speed of the induction motor 26 is regulated from below to above synchronism or vice versa, the direction of the voltage impressed on the exciting winding 30 may be reversed by manipulating the switches 48 and 49 and the connection of exciter winding 37 in the manner explained above.

The commutating field windings of commutator regulating machines are frequently excited by current which is proportional to the resultant flux of the exciting windings of the regulating machine. In Fig. 4 I have shown means whereby the commutating field winding of the regulating machine 29 is supplied with current which is proportional to the resultant flux of the commutating regulating machine and the induced current in the secondary of the induction motor 26. As will be noted from the figure, the commutating pole field winding 50 is connected to the armature of the regulating machine 29 and also the secondary winding of the induction machine 26. Thus it will be supplied with a current the magnitude of which is proportional to the armature current of the regulating machine 29 and the induced current in the secondary winding of the induction machine 26.

In order to prevent sparking it may be necessary in particular cases to reduce the current in the secondary 51 of the transformer 47 before reversing the connections through switches 48 and 49. I provide means for accomplishing this result by connecting the secondary 52 of a transformer 53 in parallel with the secondary 51 of transformer 47. The primary 54 of the transformer 53 is connected in series with the armature circuit of machine 29. Thus the current supplied through the secondary 51 of the transformer 47 to the exciting winding 30 can be reduced by allowing a fraction of it to flow through the secondary 52 of the transformer 53 to the exciting winding 30 so that the current flowing in the secondary 51 of the transformer 47 is small as compared to what it would be without the use of the transformer 53. It will be observed therefore that the direction of the voltage can be reversed by manipulating switches 48 and 49 as explained above without severe sparking.

As will be noted, the primary of the transformer 47 is connected through switch 55 and the commutating field winding 50 to the slip ring 28 of the induction machine 26. In case it is desirable to disconnect the primary of the transformer 47 when operating in the neighborhood of synchronous speed the switch 55 may be opened which will disconnect the primary from its source of supply and render it ineffective as to the circuit of the exciting winding 30. This also cuts out the commutating pole field 50 which is a desirable feature. Otherwise the system shown in Fig. 4 is essentially similar to the one illustrated and explained in connection with Fig. 3 and includes the excitation refinements of the machine 11 which were explained in connection with Fig. 2, and I have represented like parts by the same reference characters. Since in Fig. 4 the interpole field winding 50 is excited from the secondary circuit of the induction motor its flux relation reverses when passing through synchronism without any special reversing switch.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States is:

1. In combination with a variable impedance circuit, apparatus for energizing such circuit with a current substantially independent of impedance variations therein comprising a pair of commutator type alternating current dynamo electric machines having their armature windings connected in series with said impedance. A separately excited field winding and a series exciting winding on one of said machines having opposed exciting influences, and an exciting winding on the other of said machines energized from the first mentioned machine.

2. In combination with a variable impedance circuit, apparatus for energizing such circuit with a current which is substantially independent of impedance variations therein, comprising a pair of commutator type alternating current dynamo-electric machines connected in series with said impedance, a separately excited field winding and a series exciting winding on one of said machines having opposed exciting influences thereon, a third exciting winding on said machine energized in proportion to the voltage of the other machine, and an exciting winding on said other machine energized from the first mentioned machine.

3. In combination with a variable impedance device, apparatus for supplying current thereto which is substantially independent of variations in the impedance thereof, comprising a pair of alternating current dynamo-electric machines of the commutator type having their armatures connected in series with the variable impedance device, a separately excited winding and a series exciting winding connected to produce opposed exciting influences on one of said machines, two additional exciting windings on said machine energized respectively in accordance with the voltages of said two machines, and an exciting winding on the other mentioned machine energized in response to the voltage of the first mentioned machine.

4. In combination with an induction machine, means for supplying excitation to its secondary circuit comprising a commutator exciter connected in cascade therewith, an exciting winding on said exciter, a pair of commutator type dynamo-electric machines having their armature windings connected in series with said exciting winding, said series connected machines being arranged to supply said exciting winding with a current which is substantially independent of variations in impedance of said winding, and transformer means for inducing into said series connected exciting circuit a voltage proportional to the slip voltage of said induction machine.

5. In combination with an induction machine, means for supplying excitation to its secondary circuit comprising a commutator exciter connected in cascade therewith, an exciting winding on said exciter, a pair of commutator type dynamo-electric machines connected in series with said exciting winding and arranged to supply an exciting current thereto which is substantially independent of variations in impedance of said winding at different frequencies, and transformer inducing means inductively coupled between said series exciting circuit and the secondary of said induction machine, and means for reversing said inductive coupling.

6. In combination with an induction machine, a commutator exciter connected in cascade with the secondary circuit of said induction machine, an exciting winding on said exciter, a pair of commutator type dynamo-electric machines connected in series with said exciting winding for supplying thereto a current substantially independent of variations in impedance therein due to changes in frequency, a transformer having primary and secondary windings inductively coupled between the secondary circuit of said induction machine and the series exciting circuit, means for reversing the connection between the secondary of said transformer and the series exciting circuit, and an interpole field winding on said first mentioned exciter connected in series with the primary winding of said transformer.

7. In combination with an induction machine, a commutator exciter connected in cascade therewith, an exciting winding on said exciter, means for producing an exciting current in said winding which is substantially independent of variations in impedance therein due to changes in frequency, transformer means connected between the secondary circuit of said induction machine and the exciting circuit of said winding for inducing a voltage into the exciting winding circuit proportional to the slip voltage of said induction machine, a shunt circuit in said exciting winding circuit around said transformer, and a second transformer coupling between said shunt circuit and the cascade connection between said induction machine secondary and commutator exciter.

In witness whereof, I have hereunto set my hand this 8th day of January, 1929.

WALTER SEIZ.